United States Patent [19]
Mabie

[11] 3,922,759
[45] Dec. 2, 1975

[54] BELT CONNECTOR WITH FLEXIBLE BITE FEATURE

[75] Inventor: Norman H. Mabie, Claremont, N.H.

[73] Assignee: L. M. & L Corporation, Claremont, N.H.

[22] Filed: Feb. 18, 1975

[21] Appl. No.: 550,530

[52] U.S. Cl. .............................. 24/31 B; 74/231 J
[51] Int. Cl.² ............................................ F16G 3/07
[58] Field of Search .... 24/31 B, 31 C, 31 R, 113 R, 24/243 K; 46/220; 74/231 J, 236, 238

[56] References Cited
UNITED STATES PATENTS

| | | | |
|---|---|---|---|
| 1,271,014 | 7/1918 | Bower | 74/238 |
| 1,371,513 | 3/1921 | Nickerson | 74/238 |
| 2,639,622 | 5/1953 | Ginder | 74/236 X |
| 2,640,238 | 6/1953 | Schuhr | 24/113 R |
| 3,384,938 | 5/1968 | O'Connor | 24/243 K |
| 3,500,506 | 3/1970 | Mitchell | 24/113 R |
| 3,501,971 | 3/1970 | Peterson | 24/31 B X |

*Primary Examiner*—Donald A. Griffin
*Attorney, Agent, or Firm*—Pearson & Pearson

[57] ABSTRACT

A novel connector for use in forming endless belts from hollow-tubing formed of rubber, synthetic organic polymers or the like. The connector is characterized by a biting edge which is larger diameter than the inside diameter of the tubing and which is readily flexible away from the direction of insertion of the edge into the tube. Once inserted, any tension on the tube will cause the biting edge to seize the internal wall of the tubing.

11 Claims, 7 Drawing Figures

BELT CONNECTOR WITH FLEXIBLE BITE FEATURE

BACKGROUND OF THE INVENTION

This invention relates to power transmission means and, more particularly, to a novel endless belt assembly having a novel fastening means.

The advent of extruded lengths of polymeric materials has been accompanied by efforts to adapt such materials to endless belt applications. A number of fastening means were available for the purpose of connecting two free ends of belting together to form a continuous length. For example, fasteners such as hose couplings could be used, but were impractical for having flanges, barbs, etc., which damaged the belting. Moreover, since many of the endless belt materials were meltable, melt-fusion techniques were used to form continuous belts. Such methods as these, however, left much to be desired; they normally require special equipment and techniques and are difficult to apply on equipment where there is little room to work and where the belt must be formed in situ.

Other types of sharp pointed prong or barb connector devices tended to tear unreinforced polymeric belting material within an undesirably short time under only moderately severe service conditions.

Major improvements in such fastening means are disclosed in U.S. Pat. Nos. 3,605,201 and 3,461,733 to Peterson: in the latter patent, a novel fastening means in combination with a tough elastomer belt was disclosed. In the former patent, improvements on such devices were disclosed. These were largely related to the shape of the belt-seizing rib. In general, the inventions disclosed by each of these patents have been highly successful; nevertheless, it has been desirable to provide even further improvements in the art, particularly improvements relating to ease of insertion and further improved biting characteristics of the connector. Ease of insertion will minimize defective connections: improved biting will make the connector of improved value for use with a variety of different belting materials.

Thus, the principal object of the invention is to provide an improved power transmission means which consists of an easily connected endless belt useful for high tensile loads and high velocities for long periods of time without deterioration of the belt.

It is a particular object of the invention to provide a new connector, one relatively easy to insert into a tubular belt and, yet, one capable of achieving an improved bite upon the belt material.

Other objects of the invention will be obvious to those skilled in the art on their reading of this application.

SUMMARY OF THE INVENTION

Applicant has achieved these objects by forming a connector comprising a gripping member which is easily flexed away from the direction of entry into a tube to facilitate such entry. The flexible gripping member may be molded into a single-piece connector or may be assembled as a component into a connector formed of a number of pieces. The latter method has the advantage of allowing an independent choice of materials for the body of the connector and the flexible gripping member. It is most advantageous that the biting member be deeply fluted to increase the flexibility thereof.

ILLUSTRATIVE EMBODIMENT OF THE INVENTION

For a fuller understanding of the nature and objects of the invention, reference should be had to the following detailed description taken in connection with the accompanying drawings.

IN THE DRAWINGS

FIG. 6 is an end view of the article shown in elevation in FIG. 5.

Figure 1:
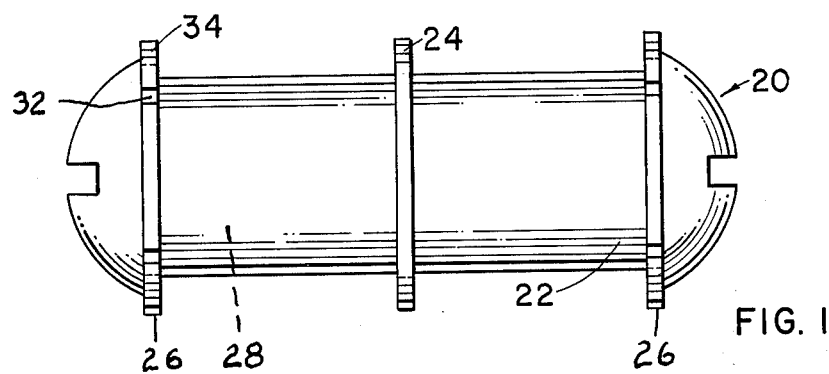
FIG. 1 is an elevation of a connector formed according to the invention.

Referring to FIGS. 1 through 4, it is seen that a fastener 20 is formed of an internally threaded cylindrical body 22 comprising a central flange 24 to aid in centering the connector. Gripping disks 26 are mounted over the threaded portions 28 of screws 23 and, as the screws 23 are threaded into threads 27 of body 22, become held between screw 28 and body 22. It should be noted that the support against flexing toward the direction of the screw is greater than any support received against flexing back toward the center of body 22. This is a consequence of the relatively large supporting radius of screwhead 25 and the relatively small supporting radius of body 22. Such a differential support system is essential in the embodiment of the invention being discussed.

Figure 2:
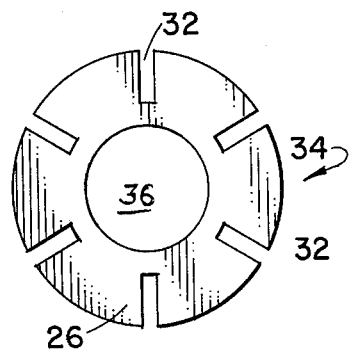
FIGS. 2 through 4 illustrate the components from which the connector of FIG. 1 is formed.
Figure 3:
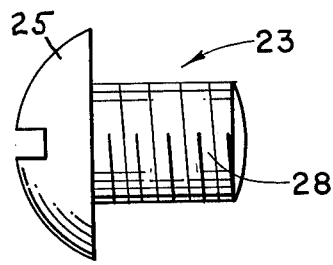
Figure 4:
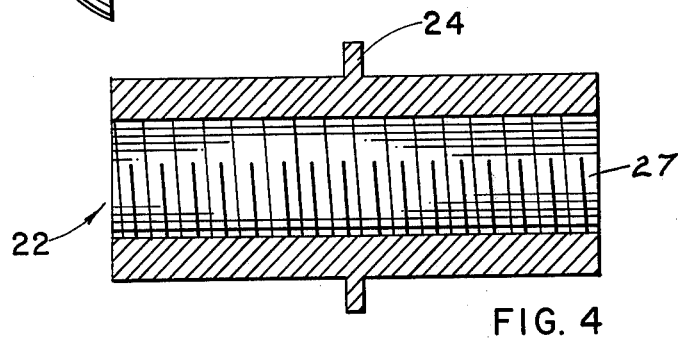

Gripping disks 26 as seen in FIG. 2, are fluted at 32 to form six different biting heads 34.

Typical dimensions of this connector are as follows.

Gripping heads: 0.010 inches thick; 0.180 inch outside diameter, and 0.080 inside diameter for aperture 36.

Screwheads: These will normally have a fine thread with a 0.153 inch outside diameter, and a 0.77 thread diameter (outside diameter of thread).

The body 22 is 0.325 inch in length with a 0.130 shaft diameter.

These dimensions are selected for use with a belt of a synthetic polyester elastomer sold under the trade name HYTREL by E. L. duPont de Nemours & Company, having a bore of 0.130 inches and an outside diameter of 0.25 inch or so.

Figure 5:
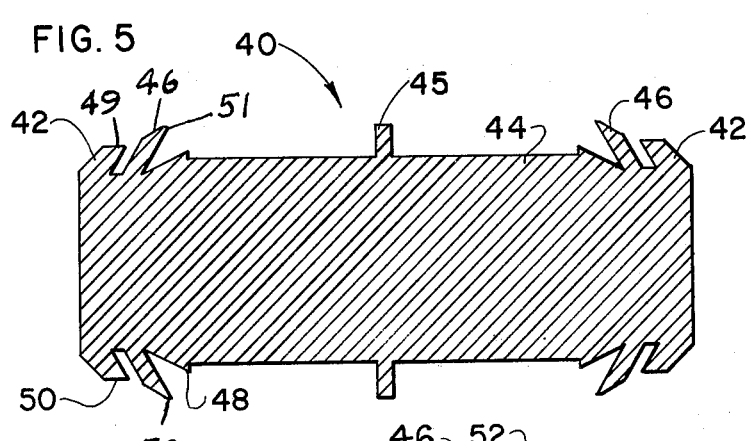
FIGS. 5 and 6 illustrate a connector formed according to the invention but which is molded into a one-piece unit.
Figure 6:
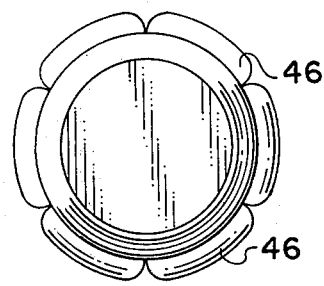
Figure 7:
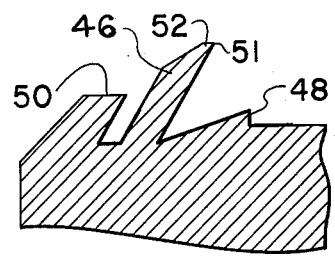
FIG. 7 is a partial view of a belt connector of FIGS. 5 and 6.

FIGS. 5 and 6 illustrate an alternative connector 40, one that can be machined or molded.

Connector 40 comprises two inwardly-sloped end members 42, a central cylinder body 44 and a centering flange 45, and fluted gripping rings or integral annular flanges 46, all of which are generally analogous to the similar members in the device of FIGS. 1 through 4. The device is also used in the same manner as the device described in FIGS. 1 through 4. However, a different procedure is used to provide means to achieve differential flexing of the gripping rings 46. The ring is tapered backwardly, or inwardly, toward the center of body 44, until it abuts an inner stop ring 48. After insertion into a belt, when tension is applied to the belt assembly, the biting ring can flex fowardly or outwardly until it intercepts the inner edge 49 of outer stop ring 50.

Among materials from which these connectors may be formed are phosphor bronze, aluminum, steel, and a variety of synthetic organic polymers.

The device of FIGS. 5–6 is preferably of the following typical dimensions in aluminum.

The body is about 0.134 inches in diameter. Gripping heads have an outside diameter of 0.180, are about 0.12 inches thick and have an angle of about 30° from vertical. The inner stop ring 48 will slant backwardly at about 60° from vertical and terminate about 0.030 inches, along the body, from the base of the gripping head. The gripping head should bear sharp edges but these can be, and preferably are, at the inner edge 51 of a flat tip 52.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

I claim:

1. In a coupling insert for joining the opposite ends of an endless belt of polymeric material to form a closed loop, said insert comprising an elongate body adapted for insertion into opposite ends, the improvement wherein said coupling comprises proximate each end thereof, a flexible outwardly projecting annular gripping ring having a sharp edge thereon adapted to engage said polymer, said ring being so fastened to said body that it is adapted to flex in a direction away from said end to which it is adjacent, and wherein said coupling includes means to restrict flexing of said gripping ring toward said end of said body.

2. A coupling insert as defined in claim 1 wherein said means to restrain flexing of said coupling is an end piece of a diameter which is relatively large with respect to the diameter of said body, said gripping ring being held betwen said end piece and said body.

3. A coupling insert as defined in claim 2 wherein said body, each said ring and each said means to restrict flexing of each said ring are formed of separate members held together by fastening means.

4. A coupling insert as defined in claim 1 wherein said flexing restraint means is an outer stop ring mounted between said flexible gripping ring and the end of said coupling proximate said gripping ring.

5. Apparatus as defined in claim 4 wherein said coupling insert comprises additionally, an inner stop ring of smaller diameter than said outer stop ring, said inner stop ring forming means to support, and resist further flexing of, said gripping ring in the direction away from said outer stop ring.

6. A coupling insert as defined in claim 1 wherein said insert is shaped from a single piece of material.

7. Apparatus as defined in claim 1 wherein said annular gripping ring normally slopes upwardly and inwardly away from the adjacent end of said coupling when said gripping ring is at rest.

8. A coupling insert for joining the opposite ends of an endless belt of polymeric material to form a closed loop, said insert comprising an elongated body adapted to be inserted within the opposite ends of an endless polymeric belt, said body having opposite ends, and a pair of outwardly projecting gripping flanges on said body, each spaced inwardly from one of said ends and each of flexible material adapted to flex from a truncated conical configuration during insertion to a disc-like configuration under withdrawal forces.

9. A coupling as specified in claim 8 plus restraining means on said coupling at said ends for restricting outward flexing of said flanges.

10. A coupling as specified in claim 9 wherein said body, flanges and restraining means are one piece.

11. A coupling as specified in claim 8 wherein each said gripping flanges is radially slit at spaced distances therearound and of thin metal.

* * * * *